United States Patent
Sherwood

(10) Patent No.: US 10,975,640 B2
(45) Date of Patent: Apr. 13, 2021

(54) LOW GRAVITY SOLIDS REDUCING PROCESSES, SYSTEMS AND METHODS, AND SOLIDS REDUCING PROCESSES, SYSTEMS AND METHODS FOR DRILLING FLUIDS, USING COLLISION FORCES WITHIN A PRESSURE DROP CHAMBER

(71) Applicant: TEKSTEIN SCIENTIFIC, Huntsville, TX (US)

(72) Inventor: Joe Sherwood, Weimar, TX (US)

(73) Assignee: Tekstein Scientific, Huntsville, TX (US)

( * ) Notice: Subject to any disclaimer, the term of this patent is extended or adjusted under 35 U.S.C. 154(b) by 0 days.

(21) Appl. No.: 16/753,022

(22) PCT Filed: Oct. 5, 2018

(86) PCT No.: PCT/US2018/054640
§ 371 (c)(1),
(2) Date: Apr. 2, 2020

(87) PCT Pub. No.: WO2019/071146
PCT Pub. Date: Apr. 11, 2019

(65) Prior Publication Data
US 2020/0318446 A1   Oct. 8, 2020

Related U.S. Application Data

(60) Provisional application No. 62/723,670, filed on Aug. 28, 2018, provisional application No. 62/569,227, filed on Oct. 6, 2017.

(51) Int. Cl.
*E21B 21/06* (2006.01)
*B01F 5/02* (2006.01)
*B01D 21/26* (2006.01)

(52) U.S. Cl.
CPC .......... *E21B 21/062* (2013.01); *B01D 21/267* (2013.01); *B01D 21/262* (2013.01); *B01D 2221/04* (2013.01); *E21B 21/065* (2013.01)

(58) Field of Classification Search
CPC ..... B05B 1/26; B01F 5/0256; B01D 2221/04; E21B 21/065
See application file for complete search history.

(56) References Cited

U.S. PATENT DOCUMENTS

| 6,199,768 B1 * | 3/2001 | Koveal .................. A62C 31/12 137/896 |
| 9,192,879 B2 | 11/2015 | McCabe |
| 2015/0014219 A1 * | 1/2015 | Spiess ....................... C10G 7/02 208/359 |

FOREIGN PATENT DOCUMENTS

CN           203440128 U  *  2/2014

OTHER PUBLICATIONS

Chen Ming et al—CN 203440128 U Machine Translation—Feb. 19, 2014 (Year: 2014).*

(Continued)

*Primary Examiner* — Bradley R Spies
(74) *Attorney, Agent, or Firm* — Fitch, Even, Tabin & Flannery, LLP

(57) ABSTRACT

A process and device to create access to low gravity solids (LGS) of about 2 to 20 microns for removal from a fluid material/LGS emulsion having the steps of: flowing the emulsion into high pressure tubing; separating the emulsion into at least two high pressure streams; forcing the emulsion through high pressure nozzles at a terminus of each of the at least two high pressure tubing streams at a speed in the range of about 10 ft/sec to 200 ft/sec or at a force in a range of about 10 to 100 PSI; and colliding the streams of emulsion exiting the high pressure nozzle within a pressure drop chamber, wherein the pressure drop is in a range of about 5%

(Continued)

to 50% of the back pressure of the nozzles; wherein a cavitation effect is realized from a collision force of the high pressure streams within the pressure drop chamber.

9 Claims, 3 Drawing Sheets

(56) References Cited

OTHER PUBLICATIONS

Jung, Sungjune et al—Atomization patterns produced by the oblique collision of two Newtonian liquid jets—Physics of FLuids 22, 042101 (2010) (Year: 2010).*
Jha Praveen Kumar et al. Emulsion Based Drilling Fluids: an Overview. International Journal of ChemTech Research, 2014, vol. 6, No_ 4, pp_ 2306-2315_.
International Search Report for PCT/US20181054640 mailed Feb. 21, 2019 in English (2 pp.).
Nritten Opinion of the Isa for PCT/US20181054640 mailed Feb. 21, 2019 in English (4 pp.).

* cited by examiner

LOW GRAVITY SOLIDS REDUCING PROCESSES, SYSTEMS AND METHODS, AND SOLIDS REDUCING PROCESSES, SYSTEMS AND METHODS FOR DRILLING FLUIDS, USING COLLISION FORCES WITHIN A PRESSURE DROP CHAMBER

CROSS-REFERENCE TO RELATED APPLICATIONS

This application is a U.S. national phase application filed under 35 U.S.C. § 371 of International Application No. PCT/US2018/054640, filed 5 Oct. 2018, designating the United States, which claims priority from U.S. Provisional Patent Application No. 62/569,227 filed 6 Oct. 2017 and U.S. Provisional Patent Application No. 62/723,670 filed 28 Aug. 2018, which are hereby incorporated herein by reference in their entirety for all purposes.

FIELD

Embodiments of the present disclosure generally relate to a processes, methods and systems for treating drilling fluids to lower the total LGS (Low Gravity Solids) by up to 50 percent more than known in the art, and particularly processes, methods and systems accesses low gravity solids using shock hydrodynamics using responsive emulsion (SHURE).

BACKGROUND

Oil based drilling fluids are primarily utilized in directional and horizontal drilling operations because of the increase in lubricity in the borehole. The detached drill cuttings are entrained in the drilling fluid and are then circulated to the surface through the annulus. The returning drilling fluid, entrained with drill cuttings, rises as a static column in the annulus. As the drilling fluid slurry rises in the annulus, it is exposed to downhole temperature, hydrostatic pressure (compaction), newly displaced drill cuttings and drill solids suspended in the drilling fluid.

The chemical interaction between the drill solids and prolonged static condition can or will cause the drilling fluid to thicken with an increase in viscosity and gel strength, as in a thixotropic state. Therefore the drilling fluid, affected by temperature, solids adsorption and compaction, will not return in a completely fluid state as it entered the borehole because of an increase in elasticity, due to the lack of agitation as the slurry enters the Flowline.

In many cases, the gelatinous properties will have a higher resistance to flow when the drilling fluid, with the entrained drill solids, comes in contact with the vibrating screen surfaces of the shale shakers. The drilling fluid condition may cause poor screen conductance, resulting in screen blinding and loss of expensive drilling fluid. In addition to the loss of whole drilling fluid, the more viscous drilling fluid will impede the G-Force separation process that assist in breaking the physical and chemical adhesive bond between the individual drill solids and the liquid phase.

When oil based and invert emulsion drilling fluids are utilized, the impact forces imparted on the vibrating screen surfaces, with the oil encapsulated drill solids, is not sufficient enough to physically break the adhesive bond between the oil and suspended solids, causing a high percentage of oil to remain on the drill solids as they are discharge from the shake shakers. In the Eagle Ford, for example, the oil-on-cuttings are from 10% to 25%. All tested samples were never less than 10%.

Drilled cuttings returning to the surface can arrive is sizes from 0.1 micron on up to 50,000 micron. Once at the surface, the Operators uses his best available and feasible technology to remove as many of these drilled cutting from his drilling fluid as possible, in the short time he has with it before it is sent back down into the well.

Once at surface, the drilling fluids passes over or through a series of mechanical solids removal devices beginning with, for example a (1) shale shaker, (2) hydro-cyclones from 4" up to 12", and/or (3) centrifuge. This describes a basic rigs surface solids removal process. These components are active and available all over the world and can work effectively down to the >15-20 micron range.

However, despite these advances in the art, removal of solids in the <20 or <15 micron range (known as the "Ultra-Fines") is not easily accomplished due simply because of their size and thus mass. These ultra-fine particles more often as not remain in the drilling fluids for numerous circulations and they continue to be reduced in size with each circulation, thus building up the percentage amount in the fluid, which become increasingly difficult to extract.

SUMMARY

Accordingly, to advance at least the aforementioned deficiencies in the art, described herein are the present disclosure generally relates to processes, systems and methods ("processes") for the reduction of low gravity solids (or ultra-fines) entrained within a drilling fluid. In particular, the present disclosure relates to processes to achieve access and thus removal of the low gravity solids down to about 4 microns in diameter.

The present processes can be mechanical with the ability to adjust proportions/parameters while operating. The present processes can utilize collision forces in a collision creating device to provide enough force to separate hydrocarbons from the drilled solids.

This separation can be the first step to gaining access to the low gravity solids trapped in the drilling fluid.

In one aspect, the present processes can be self-contained and deployed on a single skid. The present processes can slip-stream off the LP (low pressure) system of the drilling rig. The processes can return to use not only cleaner fluid but can also any barite or high gravity solids that were extracted during the process.

In one approach, a process to create access to low gravity solids (LGS) in the range of about 2 to 20 microns for mechanical removal from a fluid material and LGS emulsion is provided having the steps of: flowing the emulsion into high pressure tubing; separating the emulsion into at least two high pressure streams; forcing the emulsion through high pressure nozzles at a terminus of each of the at least two high pressure tubing streams at a speed in the range of about 10 ft/sec to 200 ft/sec or at a force in a range of about 10 to 100 PSI; and colliding the streams of emulsion exiting the high pressure nozzle within a pressure drop chamber, wherein the pressure drop is in a range of about 5% to 50% of the back pressure of the nozzles; wherein a cavitation effect is realized from a collision force of the high pressure streams within the pressure drop chamber having enough force to relax the emulsion which holds the fluid and LGS together, whereby access for removal of the LGS by mechanical means is allowed.

In one approach, the emulsion can be separated into two high pressure streams. The high pressure emulsion streams collide in the pressure drop chamber with enough force to relax the surface tension of the emulsion on the LGS. In one approach, the high pressure tubing can stream at a speed of about 92.4 ft/sec. or at a pressure of about 40 PSI.

In one approach, the speed and pressure of the emulsion can be configured to relax the surface tension of the emulsion on LGS particles down to about 4 microns, and not lower.

In one approach, the colliding the streams of emulsion exiting the high pressure nozzle can collide at an angle in a range of 0 to up to, but not including, 180 degrees, the emulsion stream collision angle can be in a range of about 30 to 170 degrees or in a range of about 30 to 90 degrees.

In one approach, the process further comprises the step of removing the LGS from the relaxed fluid by a mechanical device selected from the group consisting of shale shakers, hydro-cyclones from 4" up to 12", centrifuges, filter presses, and combinations thereof.

In another approach, a device is provided to reduce surface tension of a fluid emulsion having low gravity solids (LGS) in the range of about 2 to 20 microns to allow mechanical removal of the LGS from the fluid, and can have high pressure tubing to receive the emulsion; the high pressure tubing splitting to into at least two separate piping streams, wherein the emulsion is separated into at least two streams; high pressure nozzles at a terminus of each of the at least two separate piping streams; a device to apply pressure to the emulsion streams within the at least two separate piping streams to provide an emulsion speed in the range of about 10 ft/sec to 200 ft/sec or at a force in a range of about 10 to 100 PSI of the emulsion while exiting the high pressure nozzle; configuring the high pressure nozzles to collide the exiting emulsion streams from the high pressure nozzle within a pressure drop chamber having a pressure drop in a range of about 5% to 50% of a back pressure of the high pressure nozzles;

wherein a cavitation effect is realized from a collision force of the high pressure emulsion streams within the pressure drop chamber having enough force to relax the emulsion which holds the fluid and LGS together, whereby access for removal of the LGS by mechanical means is allowed.

In one approach, the emulsion can be separated into two separate piping streams. The exiting emulsion streams collide in the pressure drop chamber with enough force to relax the surface tension of the emulsion on the LGS.

In one approach, the device to apply pressure to the emulsion streams within the at least two separate piping streams can provide an emulsion speed of about 92.4 ft/sec or at a force of about 40 PSI of the emulsion while exiting the high pressure nozzle. The speed and pressure of the emulsion is configured to relax the surface tension of the emulsion on LGS particles down to about 4 microns, and not lower. The streams of emulsion exiting the high pressure nozzle may be configured to collide at an angle in a range of 0 to up to, but not including, 180 degrees; or an angle in a range of about 30 to 170 degrees; or at an angle in a range of about 30 to 90 degrees.

In one approach, the device further comprises a device to mechanically remove the LGS from the relaxed fluid selected from the group consisting of shale shakers, hydro-cyclones from 4" up to 12", centrifuges, filter presses, and combinations thereof.

Other features will become more apparent to persons having ordinary skill in the art to which the assemblies pertain and from the following description and claims.

BRIEF DESCRIPTION OF THE DRAWINGS

So that the manner in which the herein features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

Figure 1:
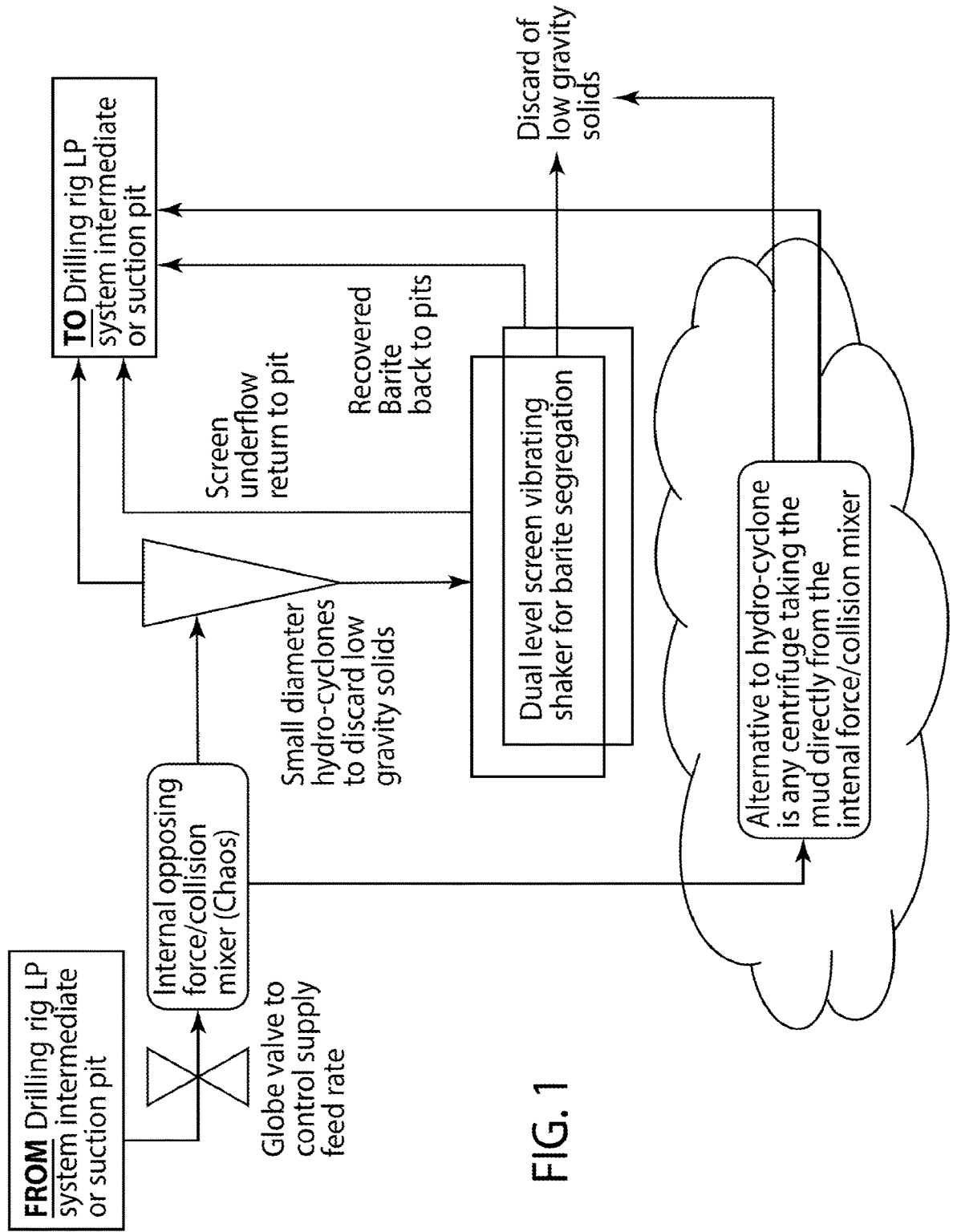
FIG. 1 is an exemplary process flow diagram on location.
Figure 2:
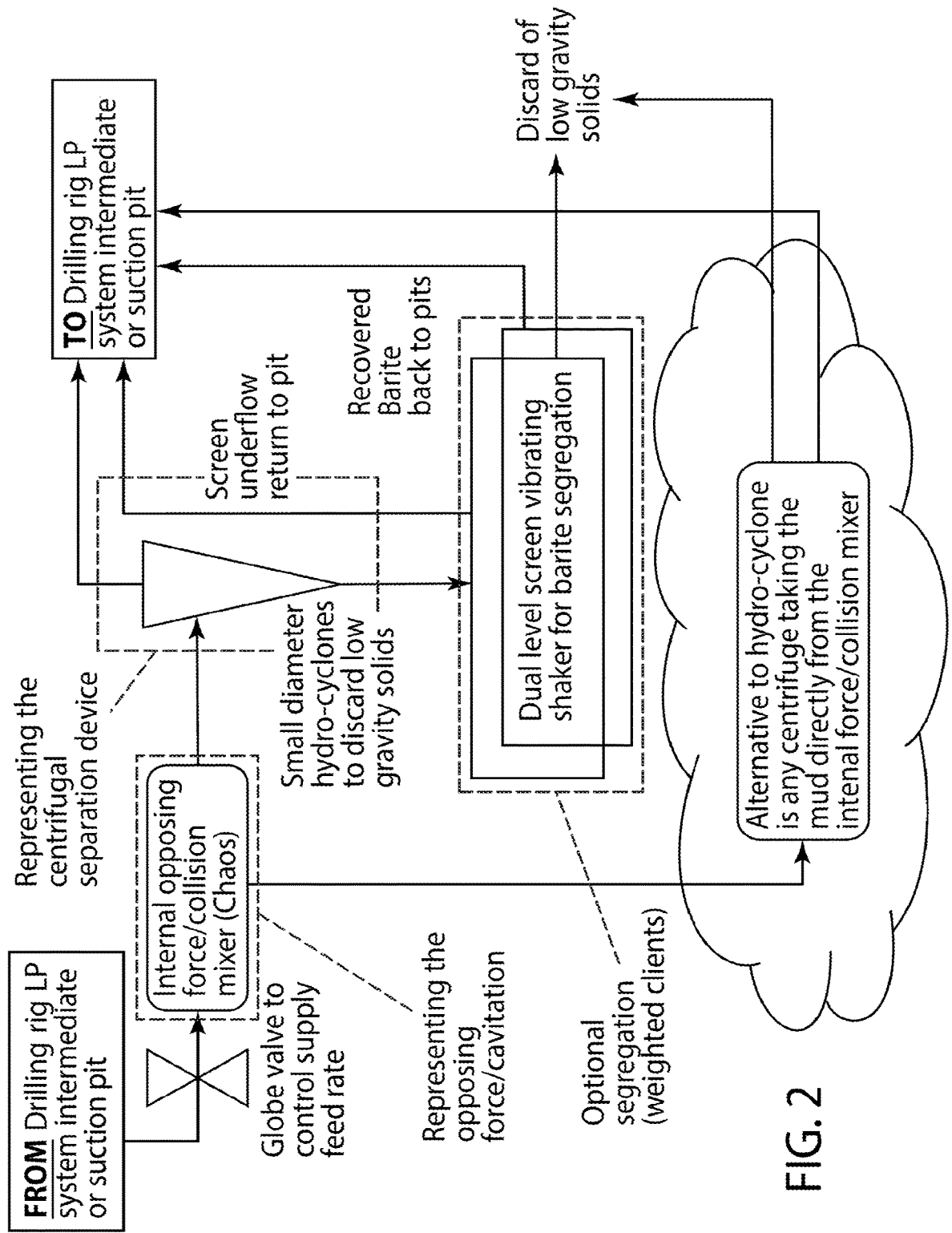
FIG. 2 is the exemplary process flow diagram (PFD) of FIG. 1 with added detail.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Described herein are processes, methods and systems for treating drilling fluids to lower the total LGS (Low Gravity Solids) by up to 50 percent more than known in the art, and particularly processes, methods and systems (processes) accesses low gravity solids using shock hydrodynamics using responsive emulsion (SHURE).

Benefits of the disclosed processes include reduction of LGS in drilling fluids which equates to multiple positive impacts to any drilling operation such as but not limited to:
  a. Better mud properties
  b. Increased rate of penetration
  c. Less downhole tool erosion
  d. Better consistency with returning to bottom with tubulars
  e. Less erosion to surface equipment such as fluid end of mud pumps and high pressure (HP) piping The present disclosure provides new processes of accessing for removal these low gravity solids (LGS) down towards the 4 micron range. Also disclosed is a new process of removing these low gravity solids down to the +/−4 micron range. Removal of LGS less than 4 microns in size/diameter is currently in a global debate of the wellbore condition if 'all' low gravity solids are removed well as it is suspected that some of these ultra-fines actually help (help prop up) the well. Accordingly, the present embodiments are designed to remove LGS, but only down to down to the +/−4 micron range and not going smaller.

Current existing rig based equipment is unable to remove the small particle (low gravity solids) which is solved by the present embodiment. Other technologies may claim to remove a limited amount of LGS, do but these are (a) complicated, (b) expensive, (c) process at very low flow rates or even batch-process. The present processes can slip-stream off an existing rig's low pressure system associated with its surface or active mud tank system Flow rates for the present embodiments can be regulated by a globe valve to +/−300 gpm.

Figure 3:
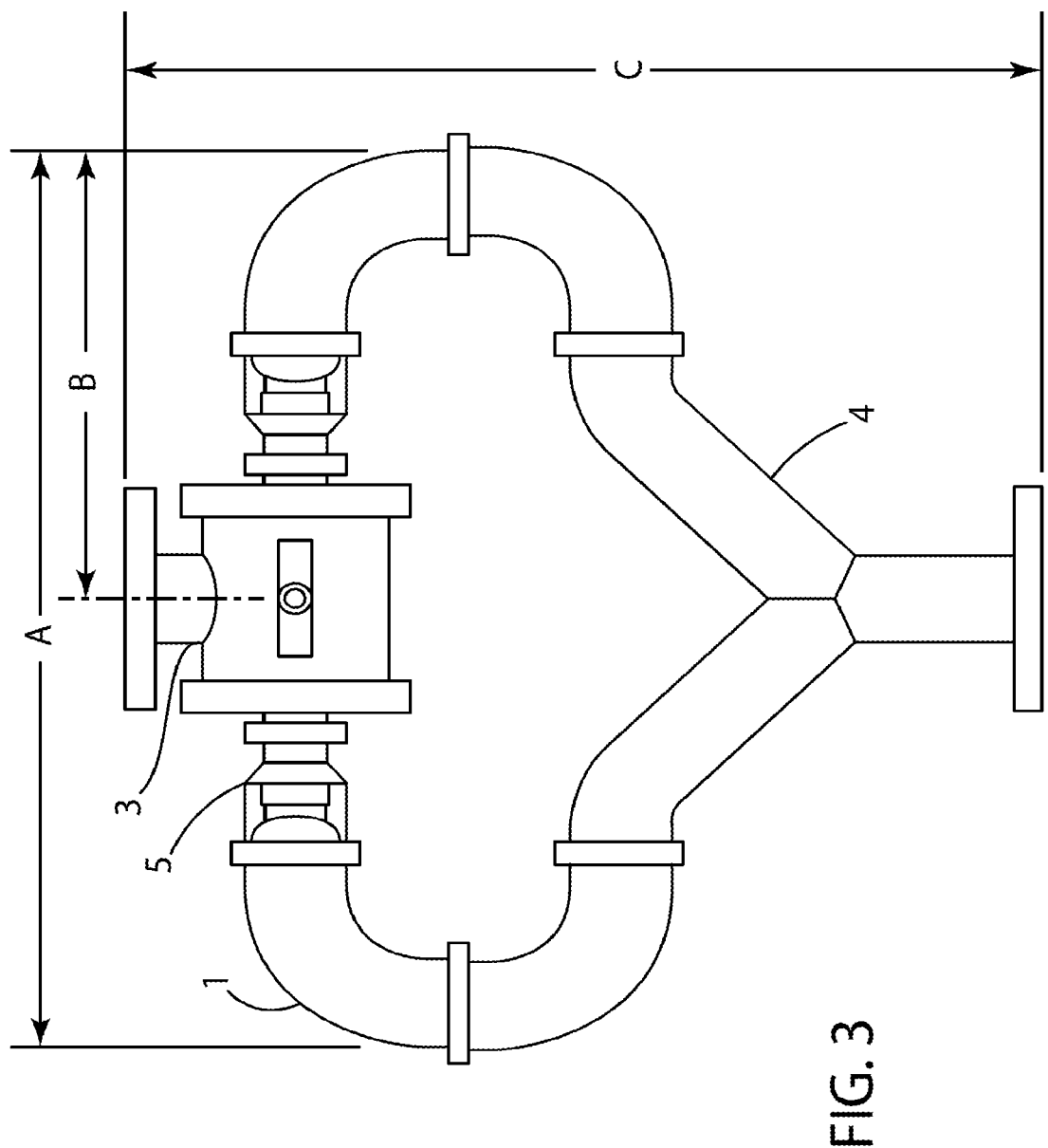
FIG. 3 is the process of the present embodiment according to one approach in a simplified form for ease of understanding.

Flow is first sent to and opposing force/collision arrangement as shown schematically in FIG. 3. Here the fluid to be processed is split into two streams and then re-directed at one another which creates a collision of solids and fluid. It is within this 'collision' creating device that the solids see the forces required to spate them from the hydrocarbons attached to them.

In one approach shown in a Process Flow Diagram (PFD)(E.g., FIG. 3):
 i. Ample feed supplied into the collision mixer chamber. Release (relax) of surface tension
 ii. Cavitation (effects of millions of imploding bubbles) allows system access to low gravity solids which would normally be carried over and away in any light phase.
 iii. Immediate segregation by force of the accessed low gravity solids.

The 'force' in can be hydro-cyclones, but centrifugal force from a centrifuge will also work.

The collision device is a mixing device that will assure maximum Electrical Stability. When the drilling fluid passes through the opposing Cavitation Mixing Nozzles and collapses in the mixing chamber due to the sudden reduction in pressure, the forming vapor bubbles implode, generating dynamic shear and fine particle dispersion.

The reason for the drilling fluid to pass first through our opposing force/collision (CHAOS) mixer is to separate the bond with the emulsion of the fluid. This is realized by the force created by the opposing force/collision (CHAOS) mixer design. Hydrodynamic Cavitation is the formation, growth and implosive collapse of developing vapor bubbles in a liquid, created by a fluctuation in fluid pressure. The hydrodynamic process generating the formation, intensity of implosion and speed of collapse can be controlled through feed pressure to produce the necessary energy dissipation levels. In the application of cavitation dispersion for finely dispersed emulsions, 92.4 ft/sec. or about 40 PSI is adequate in many embodiments.

Accordingly, the slurry enters the converging section of the Cavitation Mixing Nozzle which increases the velocity to a predetermined speed, for example, approximately 92.4 ft/sec., the slurry then passes through the throat section of the nozzle, gaining full velocity. As the slurry enters the diverging section of the diffuser the high velocity is suddenly converted into pressure, causing vapor bubbles to form.

The present processes can then be enhanced when the fluid passes through the collision device and is immediately sent to one of two segregation devices: (1) a hydro-cyclone or (2) a centrifuge.

It is noted that along with 'low' gravity solids, there may also be a need to segregate the 'high' gravity solids which are sometimes present in the form of barite, which is an intended weight build up material from the low gravity solids. If this barite product is present, it too will exit with our low gravity solids. Operators may want to retain the barite, so optionally the processes may have mechanisms in place to keep the barite, but discard the low gravity solids. These mechanisms include but are not limited to specific screen mesh above another finer mesh or even a blank on a qualifying shaker The present process can be run at the surface upstream of a mechanical separator device such as (1) hydro-cyclones, (2) decanter centrifuge, and/or (3) filter press using diatomaceous earth and/or (4) a dewatering unit using flocculation. Drilling fluid is received from the drilling rig only after it has been cleaned by the rigs conventional rig solids removal equipment. This semi-cleaned drilling fluid then is processed through the present processes, which have the ability to relax the emulsion of an oil based mud and allow the downstream mechanical device to access finer/smaller solids particles that prior art processes have heretofore not been able to access before.

Accordingly, in one approach, the present processes can include two actions/forces within its design:

FIRST—The interaction of suspended solids in a liquid can be characterized by the term "Wetting". It is the spreading of a liquid over individual solid's surface and the penetration of a liquid into a porous, suspended solid. In many cases, the liquid spreading over individual suspended particles will have a cohesive attraction to the particle. The measurement of adsorption at the liquid/solid interface and entrained air adds to the viscosity of the slurry. The chemical composition of drilling fluids create a cohesive bond between the liquid phases and the suspended solids. Breaking the bond between the liquid and suspended solids will reduce the surface tension of the liquid and release any entrained air/gas. The present nozzle design and then this nozzle being activated by supply pressure, features a novel design in non-circular nozzle orientation which initiates the SHURE process and "relaxes" this mentioned 'Bond'.

SECOND—The process of bubble generation, and the subsequent growth and collapse of the cavitation bubbles, results in very high energy densities and in very high local temperatures and local pressures at the surface of the bubbles for a very short time. The overall liquid medium environment, therefore, remains at ambient conditions. When uncontrolled, cavitation is damaging. However, by controlling the flow of the cavitation, the power can be harnessed and non-destructive. Controlled cavitation can be used to enhance chemical reactions or propagate certain unexpected reactions because free radicals are generated in the process due to disassociation of vapors trapped in the cavitating bubbles. Cavitation is the formation of empty cavities in a liquid, followed by their immediate and sudden implosion producing a shock wave. It usually occurs when a liquid is subjected to rapid changes of pressure that cause the formation of cavities in the liquid where the pressure is relatively low. When subjected to higher pressure, the voids implode and can generate an intense shock wave.

Turning to FIG. 3, one schematic embodiment (which can be bilaterally symmetrical) of the present process is shown. This scaled down version is for ease of access for testing. The SHURE process itself is shown in the present scaled down version. As shown, opposing nozzles fire into a pressure drop chamber. In one embodiment, A can be about 30.2" [768 mm], B is 15.1" [383 mm], and C is 28.6" [726 mm] in a top view at scale 1/8. According, the system may be scaled up to predetermined sizes as needed.

As shown in FIG. 3, a pair of nozzles 5 of various sizes (e.g., one half to one-inch) to create back pressure. The nozzles are fed via, for example high pressure piping 1 and 4. Many configurations of piping 1 and 4 are possible within the present embodiments. The embodiment shown is exemplary. Piping 1 and 4 configurations allow for the fluid traveling in the high pressure piping to collide against each other after passing through nozzles 5 within a pressure drop chamber 3. Natural cavitation formed from the high to low pressure relaxes the emulsion in the chamber 3. By facing (opposing) the nozzles together the surface tension on the solids is released within the fluid.

In short the processes relax the emulsion by reducing the electrical stability of the emulsion allowing access to previously inaccessible low gravity solids. Activating nozzle with high pressure begins process by reducing the surface tension on the solids due to collision force which occurs in the pressure drop chamber. As the fluid enters the chamber 3 it relaxes the emulsion where cavitation naturally occurs due to the pressure. The present processes relaxes the electrical stability (ES), from which the LGS (ultra-fines) falls out of solution, up to 50% more than known in the prior art.

One of the key features of the Present Embodiments is opposing (facing the output) of the two high nozzles to each so the output streams cross at a predetermined point based on the fluid and other variable that exist in the field. For example the angle of the streams from the nozzles may be from 0 (directly facing each other) up to almost 180 degrees (almost at right angles, preferably at about (30 to 170 degrees). As described herein the collision of the LGS laden fluids occurs in the reduced pressure chamber.

SUMMARY OF THE TWO FORCES—The reason for the drilling fluid to pass first through the present opposing force/collision mixer is to separate the bond with the surface tension of the emulsion on the solids particle. This is done by the force created by the opposing force/collision mixer design. Once the surface tension has been relaxed, the effects from Hydrodynamic Cavitation in the reduced pressure chamber with the formation, growth and implosive collapse of developing vapor bubbles in a liquid, created by a fluctuation in fluid pressure. The hydrodynamic process generating the formation, intensity of implosion and speed of collapse can be controlled through feed pressure to produce the necessary energy dissipation levels (i.e., 'Controlled Cavitation'). In the application of cavitation dispersion for finely dispersed emulsions approximately 92.4 ft/sec. or 40 PSI is adequate in many applications. It is noted though that depending on the application and composition of the fluid can be between 10 to 200 ft/sec or 10 to 100 PSI.

Once the opposing force/collision forces have been applied to the fluid and the separation of the hydrocarbons from the drilled solids has been accomplished, it is imperative to maintain this separation long enough to remove the LGS while the bond has been broken. This LGS removal can be accomplish by immediately sending the SHURE processed fluid to a mechanical separator (cones, centrifuge, filter press, dewatering units as mentioned prior).

It is preferable for the present processes to receive the drilling fluid from the drilling rig only after it has been cleaned by the rigs' conventional rig solids removal equipment. This semi-cleaned drilling fluid can then be slip streamed from the rigs low pressure line from the active pit system and run it first, through our opposing force/collision. The opposing force/collision device (or Mixer) is a mixing device that will assure maximum Electrical Stability (ES). When the drilling fluid passes through the opposing Cavitation Mixing Nozzles and collapse in the mixing chamber due to the sudden reduction in pressure, the forming vapor bubbles implode, generating dynamic shear and fine particle dispersion. Several competing technologies exist to the opposing force/collision mixer.

Once the opposing force/collision forces have been applied to the fluid and the separation of the hydrocarbons from the drilled solids has been accomplished, it is imperative to maintain this separation long enough to remove the LGS while the bond has been broken. We accomplish this LGS removal by immediately sending the opposing force/collision fluid to a hydro-cyclone manifold using 2" hydro-cyclones capable of removal down to the 4 micron range.

As with 'low' gravity solids, there may also be a need to remove 'high' gravity solids which are present sometimes in the form of barite which is an intended weight build up material. If this product is present, it too will exit hydro-cyclones. Operators will want to retain their barite so we have mechanisms in place to keep the barite but discard the low gravity solids.

While the foregoing is directed to embodiments of the present disclosure, other and further embodiments of the disclosure may be devised without departing from the basic scope thereof, and the scope thereof is determined by the claims that follow.

While the embodiments have been described in conjunction with specific embodiments, it is evident that many alternatives, modifications and variations will be apparent to those skilled in the art in light of the foregoing description. Accordingly, the present embodiments attempt to embrace all such alternatives, modifications and variations that fall within the spirit and scope of the appended claims. Throughout this specification and the drawings and figures associated with this specification, numerical labels of previously shown or discussed features may be reused in another drawing figure to indicate similar features.

I claim:

1. A process to create access to low gravity solids (LGS) in the range of about 2 to 20 microns for mechanical removal from a fluid material and LGS emulsion, comprising the steps of: flowing the emulsion into high pressure tubing; separating the emulsion into at least two high pressure streams; forcing the emulsion through high pressure nozzles at a terminus of each of the at least two high pressure tubing streams at a speed in the range of about 10 ft/sec to 200 ft/sec or at a force in a range of about 10 to 100 PSI; and colliding the streams of emulsion exiting the high pressure nozzle within a pressure drop chamber, wherein the pressure drop is in a range of about 5% to 50% of the back pressure of the nozzles; wherein a cavitation effect is realized from a collision force of the high pressure streams within the pressure drop chamber having enough force to relax the emulsion which holds the fluid and LGS together, whereby access for removal of the LGS by mechanical means is allowed.

2. The process of claim 1, wherein the emulsion is separated into two high pressure streams.

3. The process of claim 1, wherein the high pressure emulsion streams collide in the pressure drop chamber with enough force to relax the surface tension of the emulsion on the LGS.

4. The process of claim 1, wherein the high pressure tubing streams at a speed of about 92.4 ft/sec. or at a pressure of about 40 PSI.

5. The process of claim 3, wherein the speed and pressure of the emulsion is configured to relax the surface tension of the emulsion on LGS particles down to about 4 microns, and not lower.

6. The process of claim 1, wherein the colliding the streams of emulsion exiting the high pressure nozzle collide at an angle in a range of 0 to up to, but not including, 180 degrees.

7. The process of claim 6, wherein the emulsion stream collision angle is in a range of about 30 to 170 degrees.

8. The process of claim 6, wherein the emulsion stream collision angle is in a range of about 30 to 90 degrees.

9. The process of claim 5, further comprising the step of removing the LGS from the relaxed fluid by a mechanical device selected from the group consisting of shale shakers, hydro-cyclones from 4" up to 12", centrifuges, filter presses, and combinations thereof.

\* \* \* \* \*